US005820897A

United States Patent [19]

Chambers et al.

[11] Patent Number: 5,820,897

[45] Date of Patent: Oct. 13, 1998

[54] APPARATUS FOR HANDLING AND DIPPLING FLEXIBLE BELTS USING A BLOW MOLDED POLYMER CHUCKING DEVICE

[75] Inventors: John S. Chambers, Rochester; Eugene A. Swain, Webster; Ronald E. Godlove, Bergen; Rachael A. Forgit, Rochester; Huoy-Jen Yuh, Pittsford, all of N.Y.

[73] Assignee: Xerox Corporation, Stamford, Conn.

[21] Appl. No.: 508,144

[22] Filed: Jul. 27, 1995

[51] Int. Cl.[6] .............................. B05C 3/02; B29C 49/00

[52] U.S. Cl. .......................... 425/522; 269/22; 269/48.1; 279/206; 279/208; 294/98.1

[58] Field of Search .................. 269/22, 48.1; 279/2.06, 279/2.08; 294/98.1, 119.3; 118/500, 503; 264/516; 425/522

[56] References Cited

U.S. PATENT DOCUMENTS

| | | | |
|---|---|---|---|
| 3,741,409 | 6/1973 | Painter | 294/98.1 |
| 3,945,486 | 3/1976 | Cooper | 198/179 |
| 4,084,739 | 4/1978 | Koltz et al. | 269/48.1 |
| 4,587,074 | 5/1986 | De Loof | 264/516 |
| 4,601,296 | 7/1986 | Jabarin et al. | 264/516 |
| 4,680,246 | 7/1987 | Aoki et al. | 430/133 |
| 4,811,962 | 3/1989 | Cameron, Jr. | 279/2.08 |
| 5,282,888 | 2/1994 | Fukawa et al. | 118/500 |
| 5,314,135 | 5/1994 | Forrest, Jr. et al. | 242/72.1 |
| 5,318,236 | 6/1994 | Morello et al. | 241/72 R |
| 5,320,364 | 6/1994 | Mistrater et al. | 279/2.17 |
| 5,328,180 | 7/1994 | Benavides et al. | 279/2.16 |
| 5,328,181 | 7/1994 | Mistrater et al. | 279/2.17 |
| 5,334,246 | 8/1994 | Pietrzykowski, Jr. et al. | 118/69 |
| 5,358,296 | 10/1994 | Kilmer et al. | 294/98.1 |

FOREIGN PATENT DOCUMENTS

| | | | |
|---|---|---|---|
| 2479725 | 10/1981 | France | 279/2.08 |

*Primary Examiner*—Robert Davis

[57] ABSTRACT

This invention discloses a method of holding and transporting a hollow flexible belt throughout a coating process. The method includes placing an expandable insert into the hollow portion of a seamless flexible belt, and expanding the insert until it forms a chucking device with a protrusion on at least one end. A mechanical handling device is then attached to the protrusion, and will be used to move the chuck and the belt through the dipping process, as materials needed to produce a photosensitive device are deposited onto the surface of the belt, allowing it to be transformed into an organic photoreceptor. The chucking device and flexible belt are then removed from the mechanical handling device, the belt is cut to the desired width, and the chuck is removed from the inside of the photoreceptor.

4 Claims, 6 Drawing Sheets

APPARATUS FOR HANDLING AND DIPPLING FLEXIBLE BELTS USING A BLOW MOLDED POLYMER CHUCKING DEVICE

This invention relates generally to a method and apparatus for internally holding a flexible belt for processing. More specifically, the invention relates to a belt carrying chucking device which is formed by placing an insert within the inner circumference of a flexible belt, and blow molding the insert until it expands to the desired size and shape. The chucking device can then be used to handle and transport a flexible belt as a photosensitive layer is deposited onto its surface. Coating the belt with a photosensitive substance will transform it into an organic photoreceptor that will be used in an electrophotographic imaging machine.

BACKGROUND OF THE INVENTION

Imaging cylinders are typically coated by immersing the hollow cylinder into a stainless steel dip tank that contains a liquid coating solution. The cylinder is slowly withdrawn from the dip tank, causing the appropriate amount of solution to remain on the surface of the cylinder so that the desired coating thickness will be retained after drying. Present dipping and coating methods involve holding the cylinder at one end by a mechanical handling device. Problems arise when attempts are made to coat flexible belts, rather than rigid cylindrical drums using this process. The flexible belts from which electrophotographic imaging members are made are very delicate, and can easily be damaged as they are handled during photoreceptor fabrication. Typical photoreceptor substrates are made from materials that include, but that are not limited to, nickel, stainless steel, aluminum, brass, polymerics, and paper. In order to prevent the belt from becoming damaged, It is best to support the belt along the width of its inside surface during the coating and drying process until the finished photoreceptor is cut to its final width and packaged.

A major consideration in the manufacture of seamless belts is the expense involved in carrying out the coating process. The stainless steel tanks in which the coating solutions are contained are very expensive to manufacture, and their dimensions must be limited in order to control costs. On the other hand, it is desirable to dip coat as many belts at one time as is possible in order to control the costs of belt manufacture. An effective means of simultaneously limiting the size of the coating tub, and achieving maximum belt throughput is to form each belt into a shape that will allow several belts to be dip coated at the same time. Dipping the belts in this configuration will facilitate attainment of the maximum packing factor for ultra high density dipping. Most known dipping devices only allow belts to be formed into a circular shape. Thus, the manufacture of larger belts means fewer belts can be dip coated at one time.

In order to conserve coating material, and to provide an internal contact surface for electrical grounding or biasing it is desirable to confine the coating to the exterior surface of the belt. This is presently achieved by dipping the belt such that its axis is maintained in a vertical position. In addition, the ends of the belt must be sealed such that air is trapped within the lower potion of the belt, thereby prohibiting solution from migrating or coating the inside of the belt.

There is a need, which the present invention addresses, for new apparatus which provides internal support for a flexible belt which is being transported through the manufacturing process, and transformed into an organic photoreceptor.

The following disclosures may be relevant to various aspects of the present invention:

U.S. Pat. No. 5,334,246 discloses a dip coat process material handling system and method for coating multiple layers of material on a hollow cylindrical member. This system is used to produce a multi-layer optical photoconductive drum, and is an example of the type of system in which the present invention may be used.

Techniques for handling and dipping these substrates as they proceed through the manufacturing process are well known. For example, U.S. Pat. No. 5,358,296 discloses an apparatus and method for holding a rigid hollow cylindrical substrate along its inside surface. The device consists of a porous substance mounted upon a fluid passageway. The porous substance is inflated until it engages the inner surface of the substrate in the radial direction. The device continues to engage the inner surface of the substrate until a suction force is applied.

U.S. Pat. No. 5,328,181 discloses an apparatus and method for transporting and coating rigid hollow cylinders. The invention consists of a mandrel which has an expandable disk at one end and a means for expanding the expandable disk at the other. The disk is expanded in a radial direction from the mandrel such that it comes into contact with the inner surface of the hollow cylindrical substrate. This contact forms an air tight seal between the disk and the substrate, and prevents the coating fluid from coming in contact with the inner surface of the substrate during dipping.

U.S. Pat. No. 5,328,180 discloses a rigid clamp used to grip and support tubular objects. A linkage is attached to clamping shoes which are then expanded outward in the radial direction. The clamping shoes are brought in contact with the inside surface of the tubular object.

U.S. Pat. No. 5,320,364 discloses a method in which a mandrel containing an expandable component is used to dip a rigid cylinder into a coating liquid. The lower end of the mandrel is inserted into the upper open end of a cylinder. The lower end contains a mechanism which can be expanded to contact and grip the interior of the cylinder. This gripping forms a seal which traps air in the section of the cylinder below the seal during immersion of the cylinder in a coating liquid.

U.S. Pat. No. 5,318,236 discloses a device which is inserted into a roll of coiled sheet material to provide support for the sheet as it is unrolled. The device consists of a hub assembly with an axle and two rotatable hub centers that are connected to support members. The support members move in the radial direction, and engage the interior surface of the hollow roll.

U.S. Pat. No. 5,314,135 discloses an expandable mandrel used to mount a core for winding a web of sheet material. The mandrel acts as a cam which slides in an outward radial direction and comes in contact with the inside surface of the hollow core.

U.S. Pat. No. 5,282,888 discloses an apparatus used for dip coating a hollow cylindrical body which can be separated from the body without deformation or damage. A flexible bag member made from a soft plastic or rubber is inserted into the hollow portion of a cylindrical body. Compression is applied to both the upper and lower sides of the member so that the member expands in the radial direction. The flexible member comes in contact with the inside surface of the hollow cylinder and supports it throughout the dip coating process.

U.S. Pat. No. 4,680,246, discloses a method for forming a photosensitive layer on the surface of a cylindrical drum by immersing the drum into a solution of photosensitive material. A fluid tight inflatable member is used to hold the drum while it is submerged in the solution. This inflatable member is tightly pressed onto the inside wall of the drum, and prevents the photosensitive solution from contacting its inside surface.

U.S. Pat. No. 3,945,486 discloses an apparatus for supporting and transporting rigid open mouthed containers by inserting an inflatable diaphragm into the mouth of the container. Means for inflating and deflating the diaphragm, and for releasing the containers from their supports are also disclosed.

All of the references cited herein are incorporated by reference for their teachings.

SUMMARY OF THE INVENTION

In accordance with the invention, there is provided a method and apparatus for internally supporting a hollow flexible belt along its inside surface in a manner which will not cause damage to the belt, including using a blow moldable chucking device that will support a hollow flexible belt along its inner surface.

In accordance with one aspect of the invention, there is provided an insert which is placed inside the circumference of a flexible belt and expanded, thereby transforming it into a belt carrying chucking device. The end of the expanded chuck is attached to a mechanical handling device, and the chuck and flexible belt are transported along a path as the belt is dipped into a fluid. The fluid is dried onto the exterior surface of the belt, which enables the belt to act as a photoreceptor suitable for use in an electrophotographic imaging machine. The flexible belt is cut to the desired width, and the chucking device is removed from the inside of the substrate.

One embodiment of the insert used in this invention is a blow moldable, injection molded parason made from a heat and solvent resistant thermoplastic polymer. The insert is blow molded until it comes in contact with the inside surface of the flexible belt. The newly formed chuck is then attached to a mechanical handling device at protrusion located on its end. After dipping and coating has been completed, the chucking device is split into pieces and is removed from the inside of the substrate.

Although this invention is especially useful for the fabrication of electrophotographic and electrostatic imaging members, it is not limited to such application. The fabrication of electrophotographic imaging members requires elaborate, highly sophisticated, and expensive equipment. Substrates for these imaging members are coated with at least one active electrophotographic layer, and can be made from flexible belts as in this invention, or from rigid cylindrical drums. By manufacturing the substrate from a belt rather than from a drum, the speed at which the electrostatic image is reproduced is dramatically increased. In addition, using a seamless belt rather than a rigid drum will eliminate problems such as seam breakage and contamination.

The present invention has significant advantages over current methods for transforming flexible belts into electrophotographic imaging members. First, known means for transporting these belts through the dipping and coating process often require gripping them along an edge. Gripping the belt often causes damage to its outer surface and severely compromises its performance as a photoreceptor. In the present invention the belt is supported along its inside surface rather than gripped along an edge. Holding the belt in this manner virtually eliminates the type of damage that is regularly inflicted upon the surface of the substrate by conventional means.

In addition, current apparatus used to support these belts during dipping and handling have been manufactured with a single, pre-defined shape. The flexible belt will take on this pre-defined shape, which is usually circular, as it is coated. In order to force the belt to form a different shape during coating a new member with a different pre-defined shape must be designed and manufactured. There are no known means for handling and dipping flexible belts which disclose a support member whose shape can be altered. In the present invention, the insert may easily be formed into chucking devices with different shapes. This will allow the user to alter the number of belts that may be dipped into a single coating tank, by simply varying the shape of one or more belts prior to dipping and coating.

Other advantages include the ability to use a single item for supporting the belt, and for sealing its inside surface from the surrounding coating fluid. This eliminates the need for gaskets or other sealing equipment usually required for this purpose. In addition, the apparatus used in the present invention is disposable. This eliminates the need for cleaning the chucking device after one sequence of dipping and coating has been completed, and for storing large chucking devices while they are not being used. This device can then also be recycled and used again.

BRIEF DESCRIPTION OF THE DRAWINGS

These and other aspects of the present invention will become apparent as the following description proceeds and upon reference to the Figures which represent preferred embodiments.

DETAILED DESCRIPTION OF THE PREFERRED EMBODIMENT

Figure 3A:
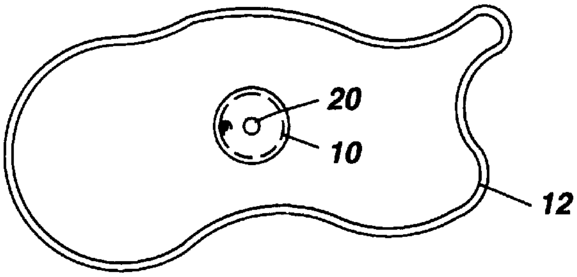
FIG. 3A shows a plan view of an insert placed inside the circumference of a flexible belt prior to expansion.
Figure 3B:
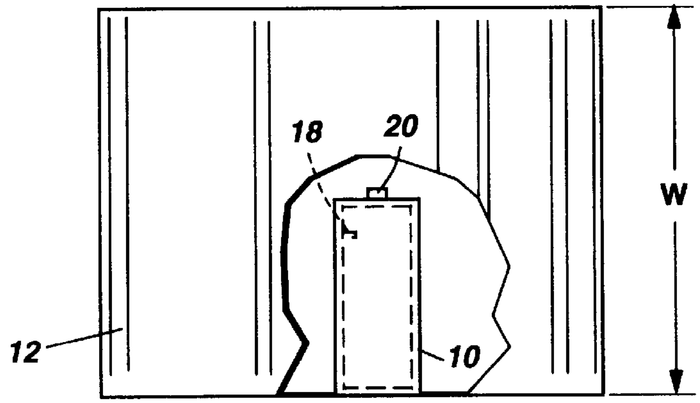
FIG. 3B shows a cut away view of an insert placed inside the circumference of a flexible belt prior to expansion.
Figure 4A:
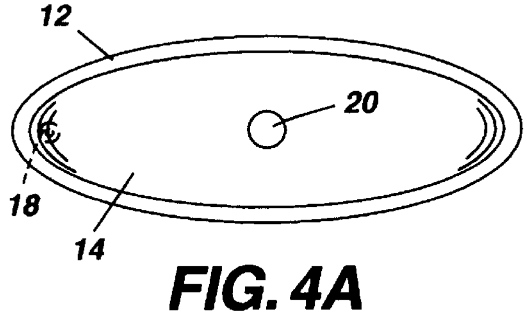
FIG. 4A shows a plan view of an expanded belt carrying chucking device inside the circumference of a flexible belt.
Figure 4B:
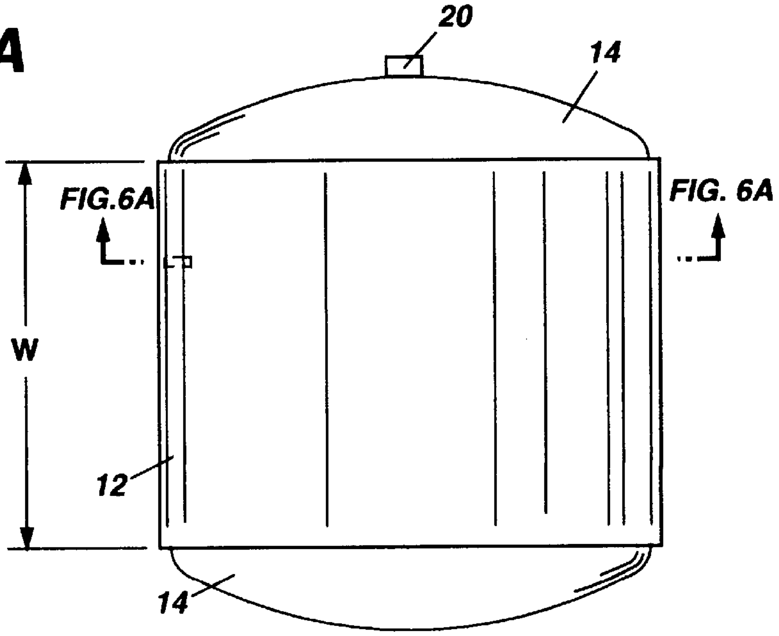
FIG. 4B shows an elevation view of an expanded belt carrying chucking device inside the circumference of a flexible belt.

Referring now to the drawings where the showings are for the purpose of describing an embodiment of the invention and not for limiting same, an insert 10 is placed inside the circumference of a flexible belt 12 as shown in FIG. 3. Insert 10 is expanded until it is transformed into a belt carrying chucking device 14 best depicted in FIG. 4. Flexible belt 12 is of the type typically used to manufacture photoreceptors used in high speed electrophotographic imaging machines. Insert 10 may be expanded to any desired size and shape. It is capable of being attached to a mechanical handling device once this expansion has been completed.

Figure 1A:
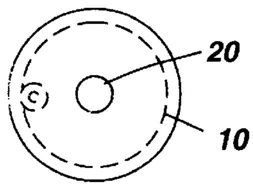
FIG. 1A shows a plan view of an insert that may be used in this invention.
Figure 1B:
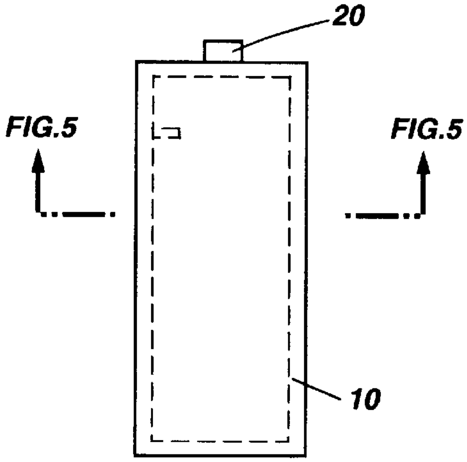
FIG. 1B shows an elevation view of an insert that may be used in this invention.
Figure 2A:
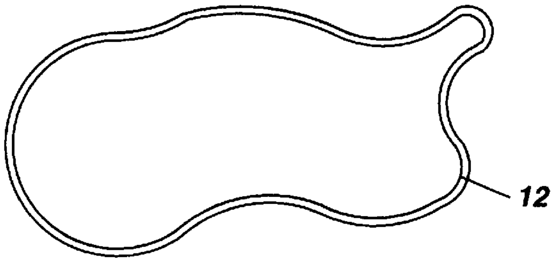
FIG. 2A shows a plan view of a typical flexible belt that may be used in this invention.
Figure 2B:
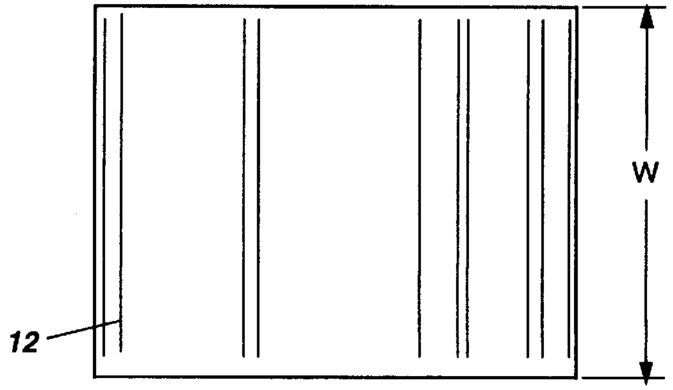
FIG. 2B shows an elevation view of a typical flexible belt that may be used in this invention.

FIG. 1 shows an embodiment of insert 10 used in this invention which comprises a blow moldable parison. A preferred class of materials from which a parison insert 10 is made are thermoplastic, high temperature, polymers which are resistant to heat and to organic solvents. Ideally, these polymers will be selected from, but not limited to the group that includes acetal resin, ionomer, polyamide, polybutene, polyesters and any of the fluoroplastics. After parison insert 10 has been placed inside of flexible belt 12, it is subjected to blow molding, a commonly known process which involves the application of heat and air. This will cause parison insert 10 to expand in the radial and longitudinal directions until it forms the desired size and shape. Thus, blow molding will transform insert 10 into a belt carrying chucking device 14 with a diameter and length that will support flexible belt 12 along its entire inside surface. When it expands to the desired size, chucking device 14 will seal the ends of flexible belt 12, thereby preventing fluid migration into the interior of the belt.

Figure 5:
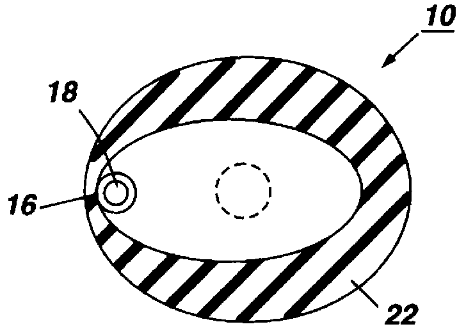
FIG. 5 shows a cross-sectional view of a parason insert prior to blow molding. The insert shown will expand to form a non-circular chucking-device.

A typical parison insert 10 used in this invention is depicted in FIGS. 1, 3,and 5. Parason insert 10 is initially designed to take on the several qualities that are required by this invention. First, as shown in FIG. 5, parison insert 10 has a wall 22 whose thickness may be varied. During blow molding insert 10 will expand more slowly in thick areas of the wall than it will in the thin areas. Thus, the shape of the expanded chucking device 14 can be altered by varying the thickness of sections of the wall 22 of parison insert 10.

FIG. 5 also shows one section 16 of wall 22 which is very thin. This area will be utilized as a tear strip after parison insert 10 has been transformed into chucking device 14. Thin walled section 16 must be present regardless of the desired shape of chucking device 14. Finally, FIG. 5 shows that parison insert 10 contains a ring shaped tab 18 that is associated with the tear strip portion of thin walled section 16. Tab 18 is placed such that it is located at the top of the thin walled section 16 on the inside of the chucking device 14 after blow molding of parison insert 10 has taken place.

As shown in FIGS. 1 and 3, a protrusion 20 is located on at least one end of the parison insert 10. As further illustrated in FIG. 4, this protrusion 20 has a size and shape that will enable the chucking device 14 to be attached to a mechanical handling device after blow molding of parison insert 10 has been completed.

An example of a manufacturing process for which this invention may be used to transform a flexible belt 12 into an organic photoreceptor 24 is depicted in FIG. 10.

Figure 10A:
FIGS. 10A–10N contain a schematic illustration of the sequence of operation of the insert and belt carrying chucking device as it moves the flexible belt through the coating process.
Figure 10B:
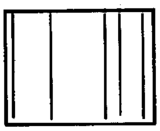
Figure 10C:
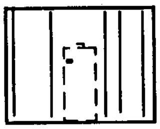
Figure 10D:
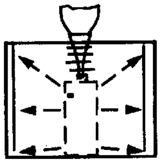
Figure 10E:
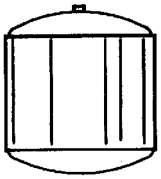
Figure 10F:
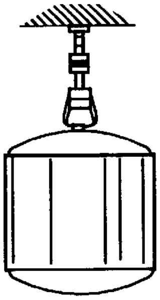
Figure 10G:
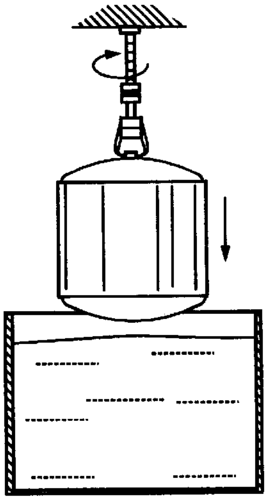
Figure 10H:
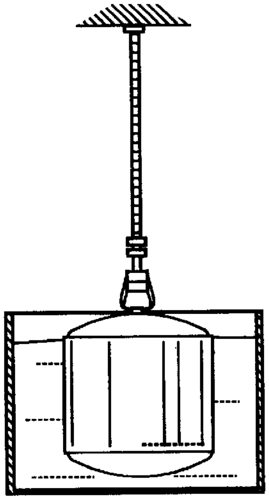
Figure 10I:
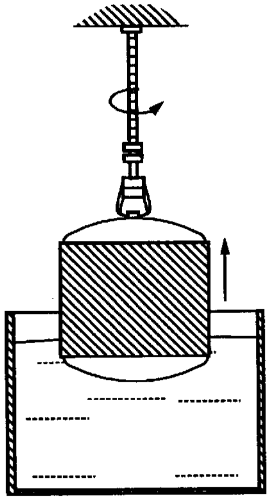

Beginning with FIG. 10E, a mechanical handling device is attached to the protrusion which has been formed on the end of the chucking device 14. The mechanical handling device is used to transport the chucking device 14 and the belt 12 along a path until it reaches one of a series of dip tanks as shown in FIG. 10F. These tanks contain the solutions that are necessary to transform a belt into an organic photoconductive device. FIG. 10G shows how the handling device is used to lower the flexible belt 12 and chucking device 14 into the tank, allowing the flexible belt 12 to be coated with the photosensitive solution. Once the belt has been coated and raised from the coating tank as shown in FIG. 10H, the photosensitive solution is allowed to dry onto the outer surface of the flexible belt 12. The belt will then be suitable for use as an organic photoreceptor 24. Many photoreceptor manufacturing processes repeat this dipping and coating sequence several times, using a different solution each time.

Figure 6A:
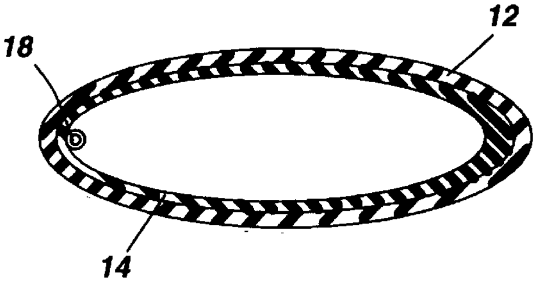
FIG. 6A shows a plan view of the flexible belt after it has been removed from the coating bath, the photosensitive solution has been dried onto its surface, and the belt has been cut to its desired width. The ends of the chucking device have been removed along with the excess belt material.
Figure 6B:
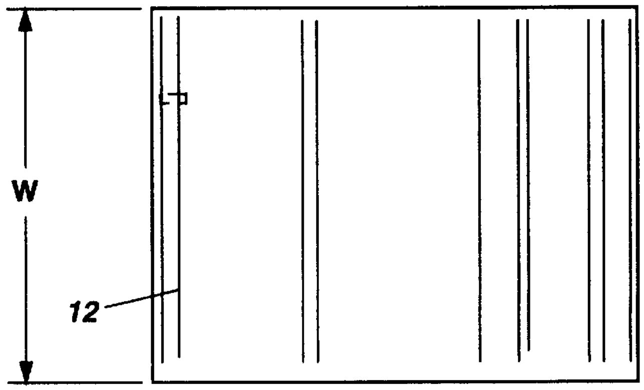
FIG. 6B shows an elevation view of the flexible belt after it has been removed from the coating solution, the photosensitive solution has been dried onto its surface, and the belt has been cut to its desired width. The ends of the chucking device have been removed along with the excess belt material.

When the photoreceptor 24 is dry, the chucking device 14 is removed from the mechanical handling device, and placed into a cutter that severs the ends of the photoreceptor 24, trimming it to the desired width, simultaneously severing the ends of the chucking device 14. This leaves a finished photoreceptor 24 with the hollow center portion of the chucking device 14 still in firm contact with its inside surface as shown in FIG. 101. The finished photoreceptor 24 with the severed chucking device 14 still intact is also shown in FIG. 6. The tab 18 that has been molded into the parison 10 is now located at the top inside edge of the hollow center portion of the chucking device 14.

Figure 7A:
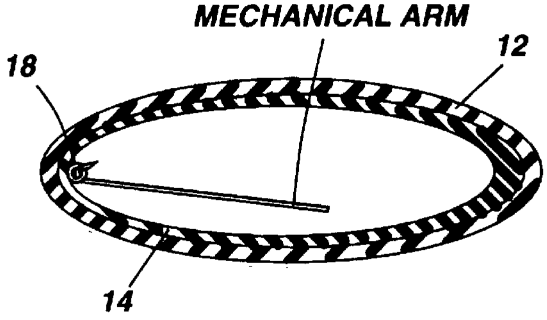
FIG. 7A shows a plan view of the flexible belt and chucking device after the belt has been cut to the desired width, and the mechanical arm has been attached to the tab.
Figure 7B:
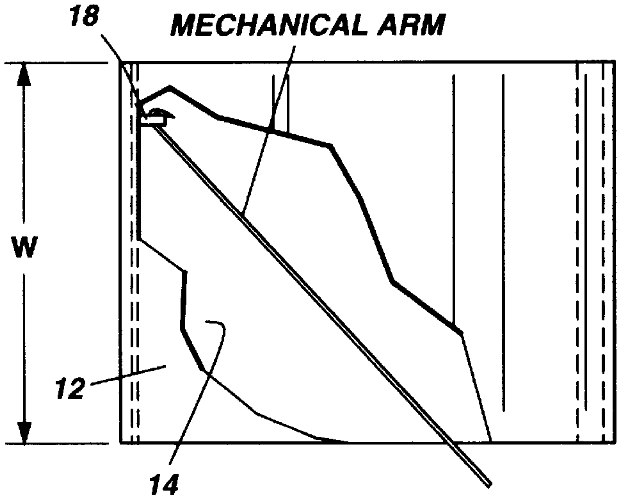
FIG. 7B shows a cut away view of the flexible belt and chucking device after the belt has been cut to the desired width, and the mechanical arm has been attached to the tab.
Figure 8A:
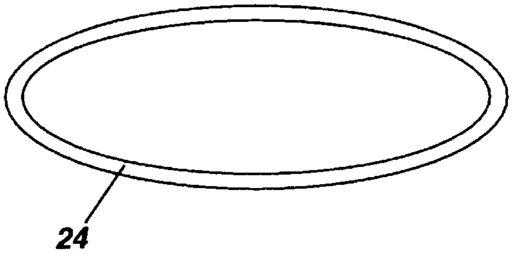
FIG. 8A shows a plan view of the Organic Photoreceptor belt after the chucking device has been removed.
Figure 8B:
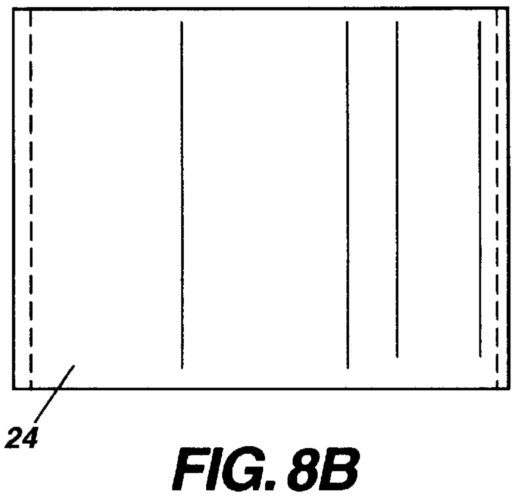
FIG. 8B shows an elevation view of the Organic Photoreceptor belt after the chucking device has been removed.
Figure 10J:
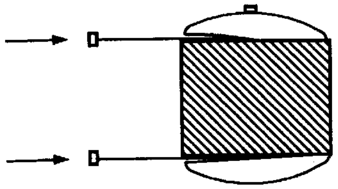
Figure 10K:
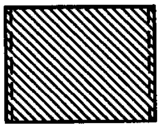
Figure 10L:
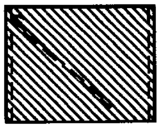
Figure 10M:
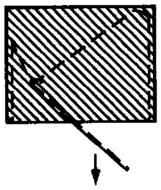
Figure 10N:
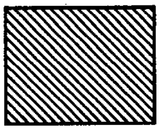

Finally, the photoreceptor substrate 14 is removed from the cutter and a mechanical arm is transported through the bottom of the finished photoreceptor 24 toward the ring shaped tab 18. The end of the arm is hooked onto the tab 18 as shown in FIG. 10J. The tab is pulled in the downward direction as shown in FIG. 10K until it comes through the bottom of the chucking device 14. FIG. 7 is an additional view which shows the end of a typical mechanical arm as it is attached to the ring tab 18. Pulling the ring tab 18 through the bottom of the chucking device 14 will split the remaining portion of the chucking device 14 into two pieces, causing it to collapse, and allowing for its easy removal from the inside of the finished photoreceptor 24. A typical finished photoreceptor is depicted in FIGS. 8 and 10L.

Figure 9A:
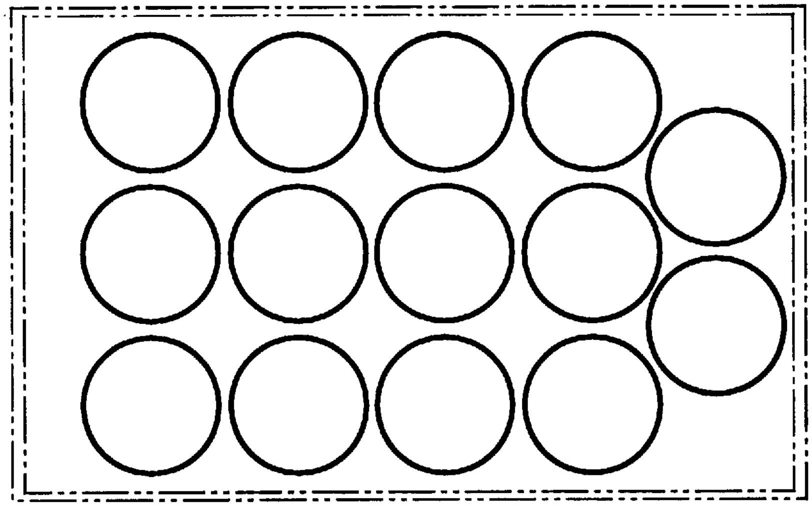
FIGS. 9A and 9B show plan views of two coating tanks with identical dimensions. The top tank contains belts that are supported by circular chucking devices, while the bottom tank contains belts that are supported by non-circular chucking devices.
Figure 9B:
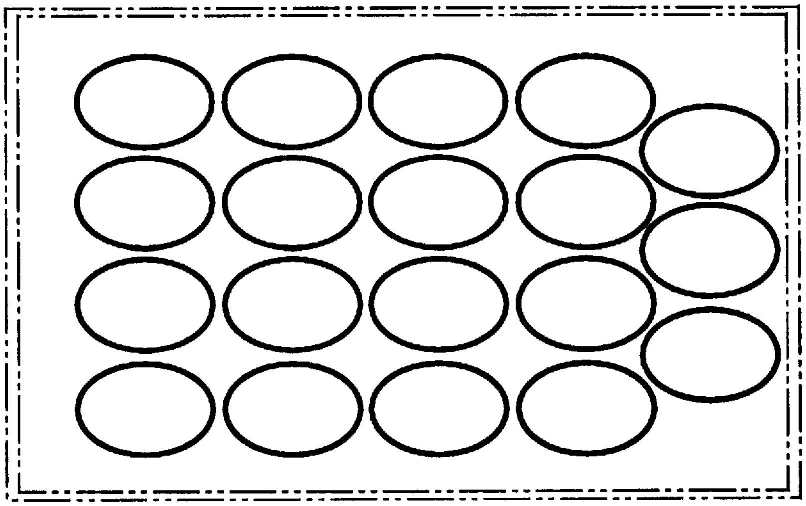

The dip tanks and the solutions used in this process are extremely expensive to manufacture, and their volumes must be limited in order to control costs. However, the cost of manufacturing photoreceptors is controlled by placing as many flexible belts as possible into one dipping tank at the same time. In order to simultaneously limit the size of the dipping tank, and place the maximum number of belts inside of it, the parison insert 10 may be blow molded such that it will form a chucking device with any shape, most notably one with an oval shape with a very high aspect ratio. A larger number of flexible belts 12 can fit into one tank if they have been formed into an oval rather than round shape. This is shown in FIG. 9 which depicts two tanks of equal dimensions that contain belts of equal lengths. One tank contains flexible belts 12 supported by oval shaped chucking devices 14 and the other contains flexible belts 12 supported by circular chucking devices 14.

Any suitable rigid or flexible substrate may be held by the apparatus of the present invention. The substrate may have a cylindrical cross-sectional shape or a non-cylindrical cross-sectional shape such as an oval. The substrate may be at least partially hollow, and will preferably be entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions.

It is, therefore, apparent that there has been provided in accordance with the present invention, a method and apparatus for handling and dipping flexible belts using a blow molded chucking-device that fully satisfies the aims and advantages herein set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A dip coating apparatus comprising:

a) an object formed into a shape suitable for insertion into an inner circumference of a flexible belt;

b) means for expanding said object until it comes in contact with an inside surface of the flexible belt;

c) means for attaching said expanded object to a mechanical handling device;

d) means for severing ends of expanded object; and e) means for removing said expanded object from the inside of the flexible belt after the flexible belt has been coated with a solution.

2. The dip coating apparatus recited in claim 1 further comprising;

a) a blow moldable, injection molded parison made from a solvent resistant and heat resistant thermoplastic polymer selected from the group consisting of acetal resin, ionomer, polyamide, polybutene, and any fluoroplastic;

b) a wall of said parison with a thickness that can be varied;

c) a protrusion located on at least one end of said parison;

d) a section on one side of said parison wall which becomes so thin that it will act as a tear strip once blow molding has been completed;

e) a ring shaped tab located at the top of said thin walled section; and f) remaining sections of said parison wall varied such that said parison will form a predetermined shape upon completion of blow molding.

3. The dip coating apparatus recited in claim 1 wherein said means for expanding comprises a blow molding process which increases a size and alters a shape of said object until it takes on a predetermined form.

4. The dip coating apparatus recited in claim 1 wherein the means for attaching comprises a protrusion located on one end of said expanded parison which is brought in contact with said mechanical handling device and secured thereto.

* * * * *